(12) United States Patent
Usher

(10) Patent No.: US 7,597,811 B2
(45) Date of Patent: Oct. 6, 2009

(54) METHOD AND APPARATUS FOR SUBSURFACE OIL RECOVERY USING A SUBMERSIBLE UNIT

(76) Inventor: David Usher, 8631 W. Jefferson, Detroit, MI (US) 48209

( * ) Notice: Subject to any disclaimer, the term of this patent is extended or adjusted under 35 U.S.C. 154(b) by 208 days.

(21) Appl. No.: 11/840,672

(22) Filed: Aug. 17, 2007

(65) Prior Publication Data

US 2008/0135494 A1  Jun. 12, 2008

Related U.S. Application Data

(60) Provisional application No. 60/868,768, filed on Dec. 6, 2006.

(51) Int. Cl.
- *B09C 1/00* (2006.01)
- *B63G 8/08* (2006.01)
- *B63C 11/00* (2006.01)

(52) U.S. Cl. .............. 210/747; 210/769; 210/776; 210/170.11; 210/922; 210/923; 405/191; 114/312; 114/337; 114/382

(58) Field of Classification Search .............. 210/769, 210/776, 170.11, 241, 242.3, 922, 923, 924, 210/925, 747, 170.01; 405/190, 191; 114/312, 114/337, 382
See application file for complete search history.

(56) References Cited

U.S. PATENT DOCUMENTS

| | | | |
|---|---|---|---|
| 3,353,364 A | 11/1967 | Blanding et al. | |
| 3,578,171 A * | 5/1971 | Usher | 210/242.3 |
| 3,831,387 A | 8/1974 | Rolleman at al. | |
| 3,890,796 A | 6/1975 | Kruger et al. | |
| 4,182,679 A * | 1/1980 | Van Hekle | 210/242.3 |
| 4,261,160 A | 4/1981 | Niewiera | 56/8 |
| 4,324,505 A | 4/1982 | Hammett | |
| 4,705,114 A | 11/1987 | Schroeder et al. | |
| 4,840,729 A * | 6/1989 | Levine | 210/170.04 |
| 5,045,217 A * | 9/1991 | Ronan et al. | 210/776 |
| 5,075,014 A * | 12/1991 | Sullivan | 210/776 |
| 5,122,283 A * | 6/1992 | Wells | 210/776 |
| 5,292,433 A | 3/1994 | Fletcher et al. | |
| 5,385,447 A | 1/1995 | Geister | |
| 5,470,467 A * | 11/1995 | Soule | 210/242.3 |
| 5,478,483 A | 12/1995 | Gore | |
| 5,753,108 A | 5/1998 | Haynes et al. | |
| 5,948,266 A * | 9/1999 | Gore et al. | 210/776 |
| 6,120,681 A | 9/2000 | Heo et el. | |
| 6,269,763 B1 * | 8/2001 | Woodland | 210/242.3 |
| 6,274,046 B1 | 8/2001 | Lundback et al. | |
| 6,485,228 B1 * | 11/2002 | Komatsu | 405/52 |
| 7,037,436 B2 | 5/2006 | Use et al. | |
| 7,137,350 B2 | 11/2006 | Waldock | |
| 2005/0025574 A1 | 2/2005 | Lazes | |

* cited by examiner

*Primary Examiner*—Jason M Greene
(74) *Attorney, Agent, or Firm*—Gifford, Krass, Sprinkle, Anderson & Citkowski, P.C.

(57) ABSTRACT

Pollutants such as hydrocarbons which have settled on the bed of a body of water are removed to the surface using a submersible vehicle positioned above the bed of a diver supported on a platform above the pollutant. A wand at one end of a pipe evacuated by a centrifugal pump is manipulated to draw the pollutant to the surface for treatment or disposal.

33 Claims, 3 Drawing Sheets

METHOD AND APPARATUS FOR SUBSURFACE OIL RECOVERY USING A SUBMERSIBLE UNIT

CROSS-REFERENCE TO RELATED APPLICATIONS

This application claims priority of U.S. Provisional Patent Application Ser. No. 60/868,768 filed Dec. 6, 2006; said application is incorporated herein by reference.

FIELD OF THE INVENTION

This invention relates to methods and apparatus for recovering hydrocarbons, including oil and oily substances, as well as other polluting chemicals, or mixtures or emulsions of chemicals that settle on or above the bed of a body of water, or sink below the water surface to remain suspended in the water, as a result of a spill and more particularly, to such a system using a submersible unit to pick up the submerged hydrocarbons.

BACKGROUND OF THE INVENTION

When a spill of hydrocarbons, such as oil, or other polluting chemicals (hereinafter referred to as polluting chemicals) occurs in a marine environment, some components of the spill, particularly oils heavier than No. 5 or other substances with a specific gravity or density higher than water, or mixtures or emulsions of these substances, will silk and settle on the bed of the body of water or become suspended in the water column, either quickly, or over time. The prior art discloses numerous methods for recovering polluting chemicals from the surface of a body of water, however, there is no suitable apparatus for recovering polluting chemicals that have settled on the bed of a body of water. It may be desirable to remove the settled polluting chemicals from their subsurface resting place or from the water in order to recover them, prevent them from entering submerged supply and/or process water intakes in the area and contaminating these water supplies, or to prevent surface recontamination resulting from components of the submerged polluting chemicals escaping back to the surface over time.

In the past, when it has been deemed desirable to recover submerged polluting chemicals, a diver has collected the polluting material by hand, or by use of hand tools and carried the material by hand to the surface for collection, or been provided with a skimming pipe and nozzle, connected by hose to a pump, to collect the subsurface polluting chemicals and pump them to the surface where they may be processed for recovery purposes or otherwise disposed of. The use of divers for this purpose is subject to several problems. First, diving operations are inherently hazardous and the minimization of their use during oil spill recovery operations reduces the hazard to personnel. Second, the risk of diving operations increases as the depth of the operation increases. Third, the diver can only spend a limited time below the surface, which prolongs the recovery operation and/or presents a considerable manpower burden upon operations. Most importantly, when walking on the bed of the body of water, the diver will disturb the polluting chemicals and either cause them to rise and obscure his vision, move them from their then present position, or drive them into the bottom sediments where they are more difficult to detect and recover.

U.S. Pat. No. 3,831,387 discloses an apparatus designed for the recovery of oil from sunken vessels. The apparatus is lowered from a ship and is latched onto the sunken vessel containing the oil. The apparatus pumps the oil through a pipe to either a storage chamber within the apparatus or to a ship on the surface of the body of water. The apparatus does not have the ability, however, to recover oil that is settled on the bed of a body of water or that is widely distributed and not confined to a container such as a ship. In the case of an oil spill wherein the oil is disassociated from a storage container or ship and settles on the bed of a body of water, the apparatus is of no use.

SUMMARY OF THE INVENTION

The present invention is therefore addressed toward a versatile method and apparatus for recovering subsurface polluting chemicals, such as oil, which avoids the need for use of a diver and employs a submersible work unit, either manually or remotely operated, which can hover above or near the oil spill and pick up the oil using a pipe and nozzle, uniquely held by a robotic arm or arms, without disturbing the oil. If the submersible is manned, the operator can directly view the bed of the body of water and operate the pipe to pick up the oil without disturbing it; if the submersible is remotely operated, a televised view of the bed is transmitted to an operator in a surface ship who controls the position of the pipe and nozzle, to effectuate the recovery operation.

In a preferred embodiment of the invention, the nozzle flow can be generated by a pump system connected to the work unit. The flow thus generated will trap and cause the oil and other debris associated with the recovery process to flow through a flexible hose toward the surface. The pump is preferably a propeller driven axial flow pump of the general type disclosed in U.S. Pat. No. 5,385,447. Oil sucked up by the negative pressure generated in the nozzle first enters a debris recovery structure where high-density particles, such as stones and gravel picked up by the nozzle, settle. The debris recovery structure may further comprise a centrifugal system to separate the oil/water suspension from the debris. The pump intake is preferably located downstream of the debris recovery structure and the output of the pump feeds an umbilical hose, which delivers the oil/water suspension to a surface support vessel. The umbilical hose or hoses may also be used to feed hydraulic power for the pump, as well as steam or the like, which is fed out through the nozzle to heat the spilled oil and lower its viscosity to aid in the suctioning.

On the surface vessel, the oil may be fed to the oil/water separation apparatus, including a skimmer, for recovery of the oil components and possible return of the non-oil component (water) to the water body. Such separation apparatus are well disclosed in the art, including U.S. Pat. No. 4,722,800. Skimming elements may alternatively be placed within the nozzle of the pipe, within the submersible vehicle, or along the umbilical hose. Such skimming elements are also well disclosed in the art including in U.S. Pat. No. 6,120,681.

Other objects, advantages and applications of the present invention will be made apparent by the following detailed description of a preferred embodiment of the invention.

DETAILED DESCRIPTION OF THE DRAWINGS

Figure 1:
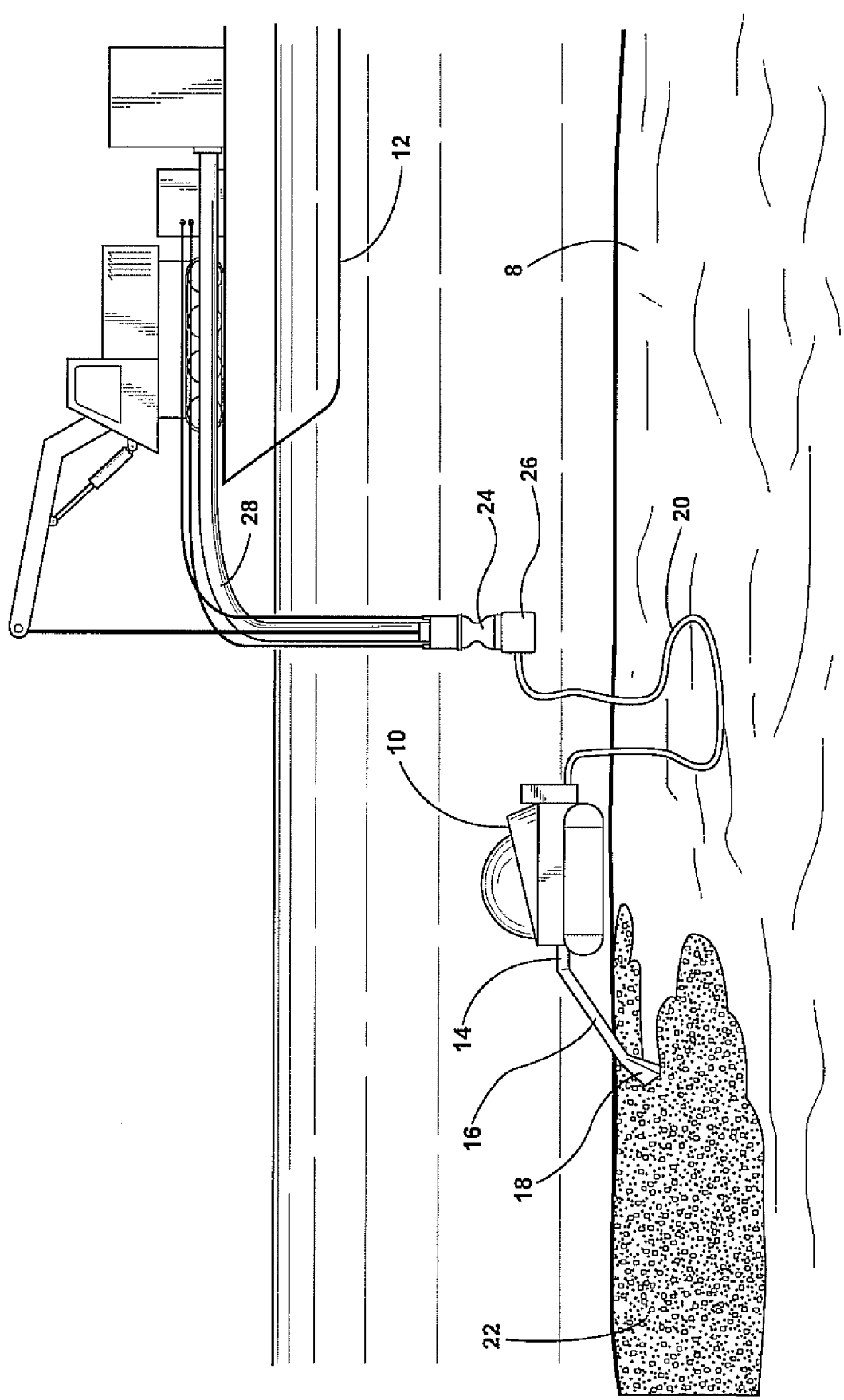
FIG. 1 is an overview of the entire oil recovery apparatus and process.
Figure 2:
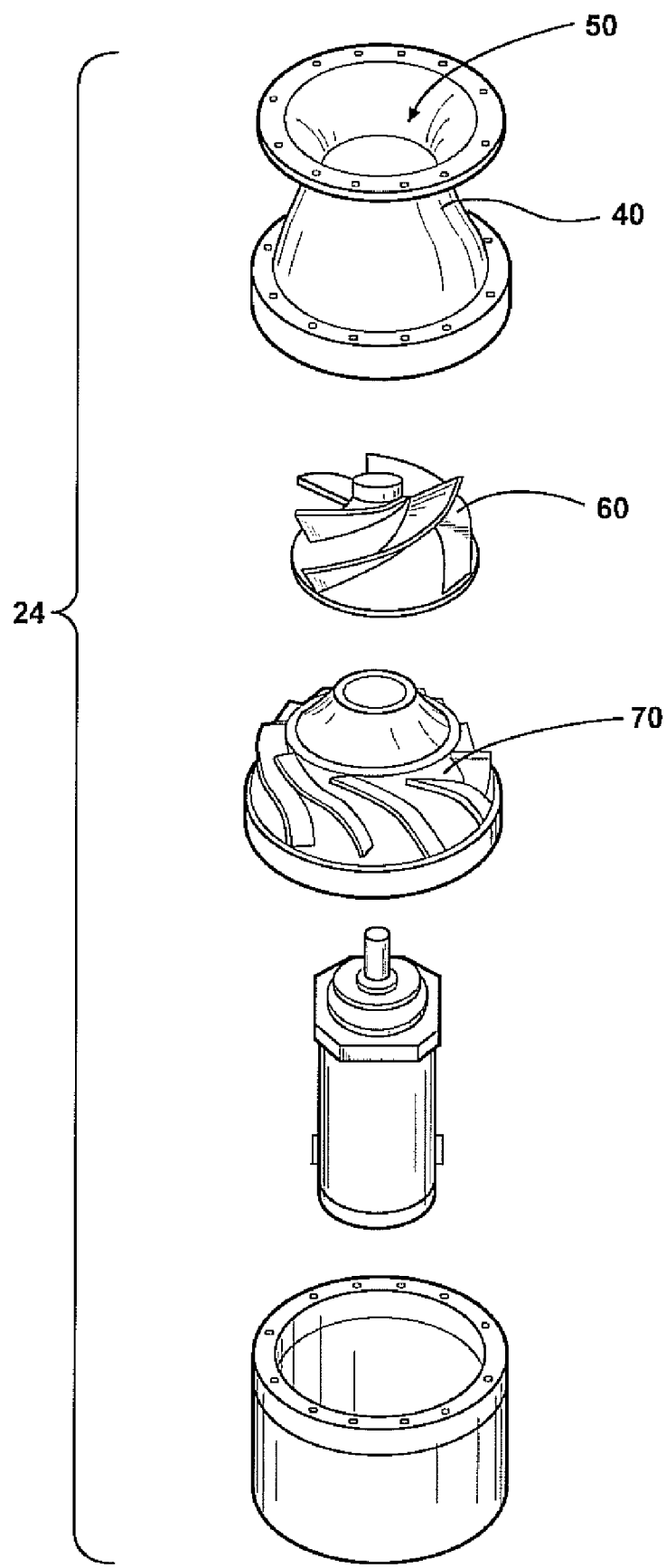
FIG. 2 is an exploded perspective view of the axial flow pump used with the preferred embodiment of the apparatus.
Figure 3:
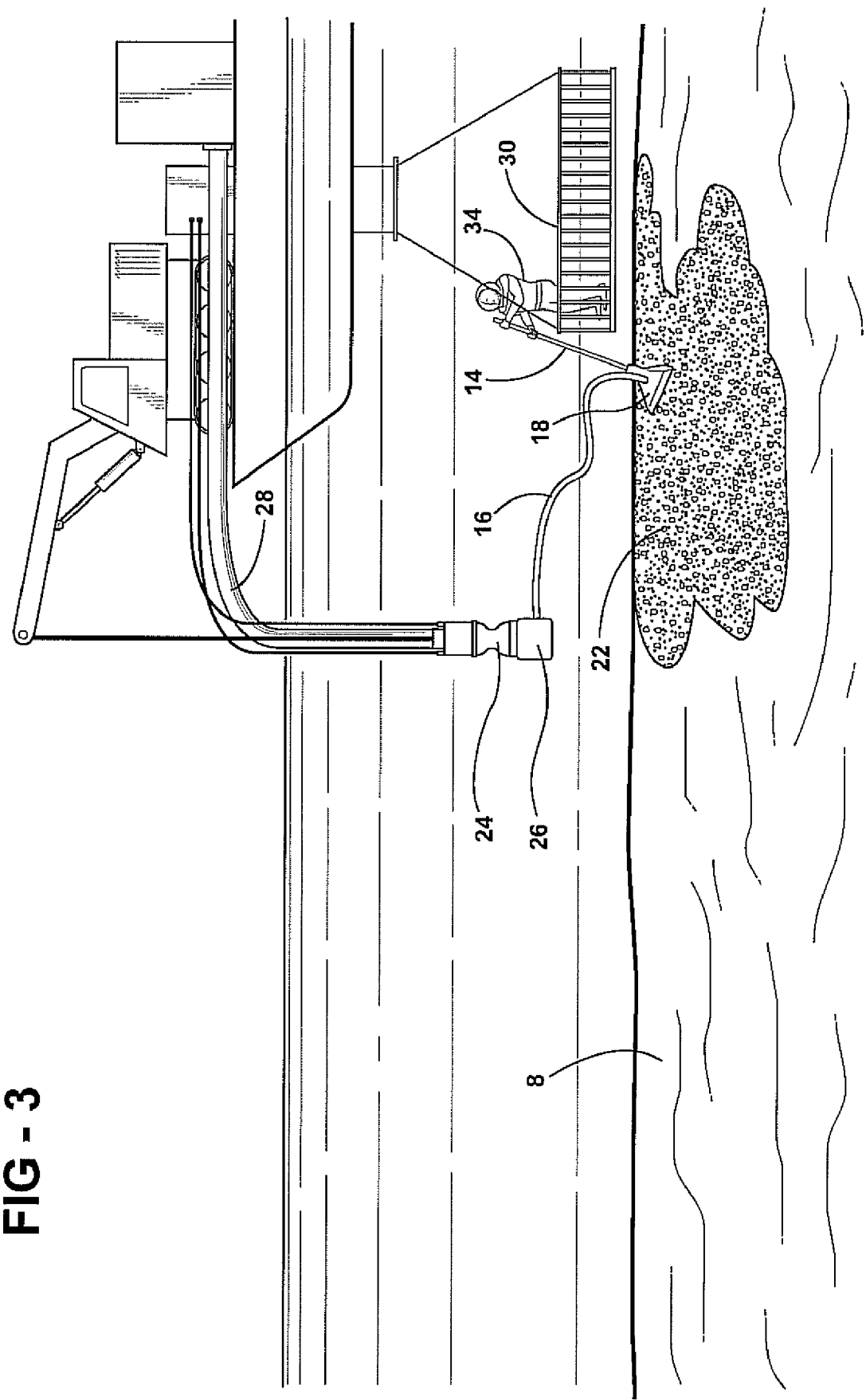
FIG. 3 is an overview of an alternative embodiment of the oil recovery apparatus and process comprising a diver support platform.

The preferred embodiment of the invention employs a submersible work unit, generally indicated at 10 of FIG. 1. The work unit may be manned or it may constitute a remotely operated vehicle (ROV). If it is a manned vehicle, it includes communication lines extending to an above water support vessel 12. If it is a remotely operated vehicle, it includes appropriate television apparatus and control apparatus which are connected either wirelessly or by cable to the vessel 12 to allow the remote operation of the submersible 10 from the surface vessel.

Such submersible vehicles are numerous in the art and need only be adapted and configured for the present application. Nuytco Research Limited of Vancouver, British Columbia in Canada has designed one such vehicle marketed as the Deepworker 2000. The Deepworker 2000 is propelled by four thrusters powered by self-contained batteries. It is capable of movement along three mutually perpendicular axes. The vehicle is outfitted with cameras and digital acoustic telemetry modems to transmit live images and data back to a surface ship. It employs a pressure transducer as a mechanism for depth sensing. The vehicle is equipped with a pair of manipulator arms and end-effectors operated by hydraulics. The arms exhibit a high degree of motion, surpassing that of the human arm, are extendable to different lengths, and are capable of lifting more than 150 lbs of weight.

The vehicle 10 is preferably equipped with a GPS-based positioning system to provide the capability of locating and marking the position of the polluting chemicals during any given dive sequence. The vehicle 10 is equipped with a controllable robotic arm(s) 14, such as those forming part of the Deepworker 2000. The robotic arm 14 controls the positioning of a pipe 16 that has a nozzle 18 on its end. The pipe 16 and nozzle 18 are attached to the arm 14 such that the movement of the arm 14 controls the movement of the pipe and nozzle. Alternatively, the vehicle may have a plurality of arms controlling a plurality of pipes with nozzles at their ends. In this case, the pipes may eventually be merged together at a junction at some point along their length.

The work unit 10 is controlled to be positioned immediately above the bed of the body of water 8 that is contaminated by an oil spill 22, or adjacent to polluting chemicals suspended in the water column. Preferably, the submersible work unit will be controlled so that it does not settle on the bottom and disturb the oil. The operator, either within the submersible 10 or the support vessel 12 controls the robotic arm(s) 14 to move the nozzle(s) 18 along the oil patch to effectively vacuum up the oil.

Suction is applied to the nozzle 18 through a flexible hose 20 which entrains the suctioned flow to a debris recovery structure 26. The pipe(s) 16 may enter the submersible vehicle 10 from one side, and exit it from the other side. Alternatively the pipe(s) 16 may extend to the hose 20 and the debris-recovery chamber 26 from outside the submersible vehicle 10.

The suctioned flow through the pipe 16 and the hose 20 is provided by a submersible pump 24, which is preferably a propeller-driven axial pump. Such pumps are disclosed in the art, including that described in U.S. Pat. No. 5,385,447, "Axial Flow Pump For Debris-Laden Flow". This pump is designed for the multi-phase flow of high viscosity liquids. That is, it is capable of generating flow of high viscosity liquids, such as oil, that may be laden with debris including wood, rock, sediments, kelp, and bits of metal among other things. This particular pump is hydraulically or otherwise driven and comprises a venturi-shaped intake 40 having an inlet 50, a throat of minimum area, and an outlet. It further comprises an impellor 60 and stator 70, each with a plurality of blades.

The pump 24 is disposed downstream of a debris recovery chamber 26 and the intake of the pump is maintained at that downstream position. The suction of the pump draws oil from the spill 24, along with some water, through the debris recovery structure 26. At that point, any high-density particles, such as stones, gravel and the like, will fall to the bottom of the recovery chamber 26 for later removal. The debris recovery structure 26 may alternatively comprise a centrifuge to separate debris from the oil/water suspension. The debris recovery structure 26 may comprise a chamber for removal or ejection of any collected debris, thereby preventing pauses in the oil recovery process due to the clogging of the structure.

The oil and/or water, free of the debris, will be fed by the pump 24 up the umbilical hose 28, which has its output in the surface vessel 12. A float or series of floats 30 may be used to support the hose 28 and, system preferably includes adaptable floats and/or ancillary rigging to support a number of different buoyancy-adjusted configurations to suit various water depths or other emergent conditions.

The hose 28 may also be used to direct hydraulic power for the pump, steam and the like, generated in the surface vessel, down through the pump 24 or to the nozzle 18 where the steam is directed toward the oil spill 22 in order to heat the oil and lower its viscosity so it may be more easily drawn into the nozzle.

The surface vessel may include appropriate skimming apparatus or other liquid hydrocarbon/water separation apparatus of conventional design, to separate the oil components from any water drawn up through the system. The oil might be stored in an appropriate tank, and the water may be discharged back into the body of water. Skimming elements may alternatively be placed within the nozzle 18 of the pipe 16, within the submersible vehicle 10, or along the umbilical hose 28.

In an alternative embodiment of the present invention, the submersible work unit may comprise a diver support platform 30. The diver support platform is tethered directly to the surface vessel 12 allowing the vessel and work unit to move along the recovery path as a single unit. In this embodiment the diver 34 supported by the platform 30 may control the positioning of the pipe and nozzle structure with his own hands, eliminating the necessity of a robotic arm. The depth of the platform 30 within the body of water is controlled from the support vessel.

Unlike the previous diver operated systems, the system of the present invention may be operated for long continuous periods and its speed of operation is substantially improved over that of the diver because of minimization of disturbance of the subsurface polluting chemicals allowing improved visibility for the collection operation. The method and apparatus allow for the recovery of polluting chemicals that have settled on the bed of a body of water and polluting chemicals that are widely spread in the subsurface of the body of water. The apparatus has a much longer underwater operating time than pure diver-based operations and increases the depth at which operations may be carried out.

Having thus disclosed my invention, I claim:

1. An apparatus for the recovery of polluting chemicals disposed on the bed of a body of water having a surface, or within the body beneath the surface, comprising:

a submersible work unit operative to be positioned within the body of water, below the surface, and adjacent to and above the polluting chemicals;

a system operative to control the position of the work unit within the body of water;

an elongated pipe having a first end supported adjacent to the work unit and a second end disposed at a remote location;

a nozzle attached to the second end of the pipe, operative to serve as an entry into the pipe for the polluting chemicals;

a pump for drawing polluting chemicals from the second end of the pipe to the first end;

a vessel on the surface of the body of water operative to receive and/or process the recovered polluting chemicals.

2. The apparatus of claim 1 further comprising an elongated support having a first end connected to the submersible work unit and a second end extending from the work unit.

3. The apparatus of claim 2 wherein said elongated support comprises a robotic mechanical arm.

4. The apparatus of claim 3 further comprising a control system for moving and positioning the second end of said robotic arm.

5. The apparatus of claim 3 wherein said robotic arm is capable of movement along three mutually perpendicular axes.

6. The apparatus of claim 2 wherein the position of the second end of said elongated support determines the position of the second end of said elongated pipe.

7. The apparatus of claim 1 wherein said work unit comprises a diver support platform.

8. The apparatus of claim 7 wherein said diver support platform is tethered to the surface vessel such that the platform and surface vessel move together as a single unit.

9. The apparatus of claim 7 further comprising a system to control the depth of said diver support platform within the body of water.

10. The apparatus of claim 1 wherein said submersible work unit comprises an occupant controlled vessel.

11. The apparatus of claim 10 wherein said submersible vessel comprises thrusters operative to position the submersible vessel within the body of water.

12. The apparatus of claim 1 further comprising a debris recovery structure operative to remove debris from the recovered polluting chemicals.

13. The apparatus of claim 12 wherein said debris recovery structure comprises a chamber for removal or ejection of any collected debris.

14. The apparatus of claim 1 further comprising a hydrocarbon/water separator operative to separate the recovered polluting chemicals from any water that may have been recovered with it.

15. The apparatus of claim 14 wherein said hydrocarbon/water separator comprises skimming elements operative to separate the recovered polluting chemicals from any water that may have been recovered with it.

16. The apparatus of claim 1 wherein said nozzle comprises skimming elements operative to separate water from polluting chemicals.

17. The apparatus of claim 1 further comprising a camera system operative to provide images of an area on the bottom of the body of water to a location remote from the imaged area.

18. The apparatus of claim 17 comprising communications channels for relaying images obtained from said camera system to said remote location.

19. The apparatus of claim 1 wherein said pump comprises a hydraulically driven axial flow pump.

20. The apparatus of claim 1 comprising a second elongated pipe having a first end connected to the said pump and a second end extending to the surface of the body of water, said pipe operative to deliver the recovered polluting chemicals to the surface of the body of water.

21. The apparatus of claim 1 further comprising a system of adaptable floats and/or ancillary rigging operative to support the apparatus at a plurality of water depths.

22. The apparatus of claim 1 further comprising a system to deliver steam and/or heat to the settled polluting chemicals, said steam and/or heat operative to decrease the viscosity of the polluting chemicals.

23. An apparatus for the removal of polluting chemicals settled on or above the bed of a body of water having a surface, comprising:

a submersible vehicle operative to be positioned within the body of water, beneath the surface, adjacent to and above the settled polluting chemicals;

a propulsion system for the vehicle operative to control its position within the body of water;

a robotic mechanical arm having a first end connected to the vehicle and a second end extending from the vehicle;

a control system for moving and positioning the second end of the robotic mechanical arm;

a vessel on the surface of the body of water operative to receive and/or process the recovered polluting chemicals;

a first elongated pipe having a first end supported by the second end of the robotic arm and a second end connected to a debris recovery chamber;

a nozzle connected to the first end of the first elongated pipe operative to serve as an entry point for the settled polluting chemicals drawn into the pipe;

a hydraulically driven axial-flow pump for drawing polluting chemicals and other materials associated with the recovery process from the first end of the first elongated pipe to the second end;

a second elongated pipe having a first end connected to the hydraulically driven axial-flow pump and a second end extending to the vessel on the surface of the body of water;

a debris recovery structure operative to separate any debris from the polluting chemicals; and a hydrocarbon/water separator operative to remove water from the polluting chemicals.

24. A method for the recovery of polluting chemicals settled on the bed of a body of water comprising:

positioning a vessel on the surface of the body of water such that it is near a location above the settled polluting chemicals;

positioning an occupant controlled submersible work unit below the surface of the body of water adjacent to and above the settled polluting chemicals;

positioning a pipe and nozzle associated with the submersible work unit adjacent to the settled polluting chemicals;

drawing the settled chemicals into and through the pipe by means of suction generated by a pump;

pumping the collected polluting chemicals through a pipe to the vessel on the surface of the body of water;

repositioning the pipe and nozzle associated with the submersible work unit so as to maintain their position adjacent to the settled polluting chemicals;

storing the collected polluting chemicals in the vessel on the surface of the body of water.

25. The method of claim 24 further comprising separating debris from the collected polluting chemicals.

26. The method of claim 24 further comprising separating water from the collected polluting chemicals.

27. The method of claim 24 further comprising delivering steam and/or heat through the pipe and nozzle so as to decrease the viscosity of the polluting chemicals.

28. The method of claim 24 further comprising controlling the position of the submersible work unit from a remote location.

29. The method of claim 24 further comprising controlling the position of the pipe and nozzle from a remote location.

30. The apparatus of claim 23 in which the submersible vehicle is occupant controlled.

31. The apparatus of claim 23, further comprising a system of adaptable floats operable to support the vehicle at a controlled depth within the body of water.

32. The apparatus of claim 23, further comprising a system to deliver heat, from the vessel, through said first and second elongated pipes to the settled polluting chemicals.

33. The apparatus of claim 24 wherein the chemicals comprise hydrocarbons.

* * * * *